US012768378B2

(12) United States Patent
Chen et al.

(10) Patent No.: US 12,768,378 B2
(45) Date of Patent: Oct. 20, 2026

(54) FASTENING DEVICE AND FIXING ASSEMBLY

(71) Applicant: Fulian Precision Electronics (Tianjin) Co., LTD., Tianjin (CN)

(72) Inventors: Hung-Wei Chen, New Taipei (TW); Yu-Yong Huang, New Taipei (TW)

(73) Assignee: Fulian Precision Electronics (Tianjin) Co., LTD., Tianjin (CN)

(*) Notice: Subject to any disclaimer, the term of this patent is extended or adjusted under 35 U.S.C. 154(b) by 175 days.

(21) Appl. No.: 18/829,675

(22) Filed: Sep. 10, 2024

(65) Prior Publication Data

US 2025/0122897 A1 Apr. 17, 2025

(30) Foreign Application Priority Data

Oct. 16, 2023 (CN) ......................... 202311333974.7

(51) Int. Cl.
*F16B 5/01* (2006.01)

(52) U.S. Cl.
CPC ...................................... *F16B 5/01* (2013.01)

(58) Field of Classification Search
CPC .... F16B 5/0024; F16B 5/0028; F16B 5/0032; F16B 5/0036; F16B 5/0052; F16B 5/0072; F16B 5/0076; F16B 5/0088; F16B 5/0208; F16B 5/0216; F16B 5/0225; F16B 5/025; F16B 5/0266; F16B 2200/40; F16B 2200/403; F16B 2200/406
USPC ...................................... 403/DIG. 4, DIG. 10
See application file for complete search history.

(56) References Cited

U.S. PATENT DOCUMENTS 3,060,786 A * 10/1962 Flower .................. F16B 5/0208 411/432
3,378,054 A * 4/1968 Vaughn ................. F16B 39/023 411/106
8,950,991 B2 * 2/2015 Trifilio .................. F16B 5/0208 411/103

FOREIGN PATENT DOCUMENTS

CN 116529120 A * 8/2023 ............ F16B 37/044

* cited by examiner

*Primary Examiner* — Amber R Anderson
*Assistant Examiner* — Zachary A Hall
(74) *Attorney, Agent, or Firm* — ScienBiziP, P.C.

(57) ABSTRACT

A fastening device can fix a first plate on a second plate, the first plate is defined a positioning hole. The fastening device includes a fixing member, a pressing member, a guiding member, and an elastic member. The guiding member is partially disposed in a receiving cavity of the fixing member and protruding from the fixing member to connect to the pressing member. The guiding member can extend through the positioning hole to cause the second plate to be disposed between the fixing member and the pressing member. The elastic member is disposed in the receiving cavity and resisting against the receiving cavity and the guiding member. The elastic member can drive the guiding member and the pressing member toward the first plate when the second plate moves between the pressing member and the fixing member. The present disclosure further provides a fixing assembly including the fastening device.

14 Claims, 11 Drawing Sheets

FASTENING DEVICE AND FIXING ASSEMBLY

FIELD

The subject matter herein generally relates to a fastening device and a fixing assembly having the fastening device.

BACKGROUND

When a circuit board is installed onto an object such as a housing, the circuit board is usually fixed by I-shaped nails. However, a gap may exist between the nail and the circuit board, which causes the circuit board and the housing to not be in close contact with each other, thereby resulting in poor thermal or electrical conductivity between the circuit board and the housing. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
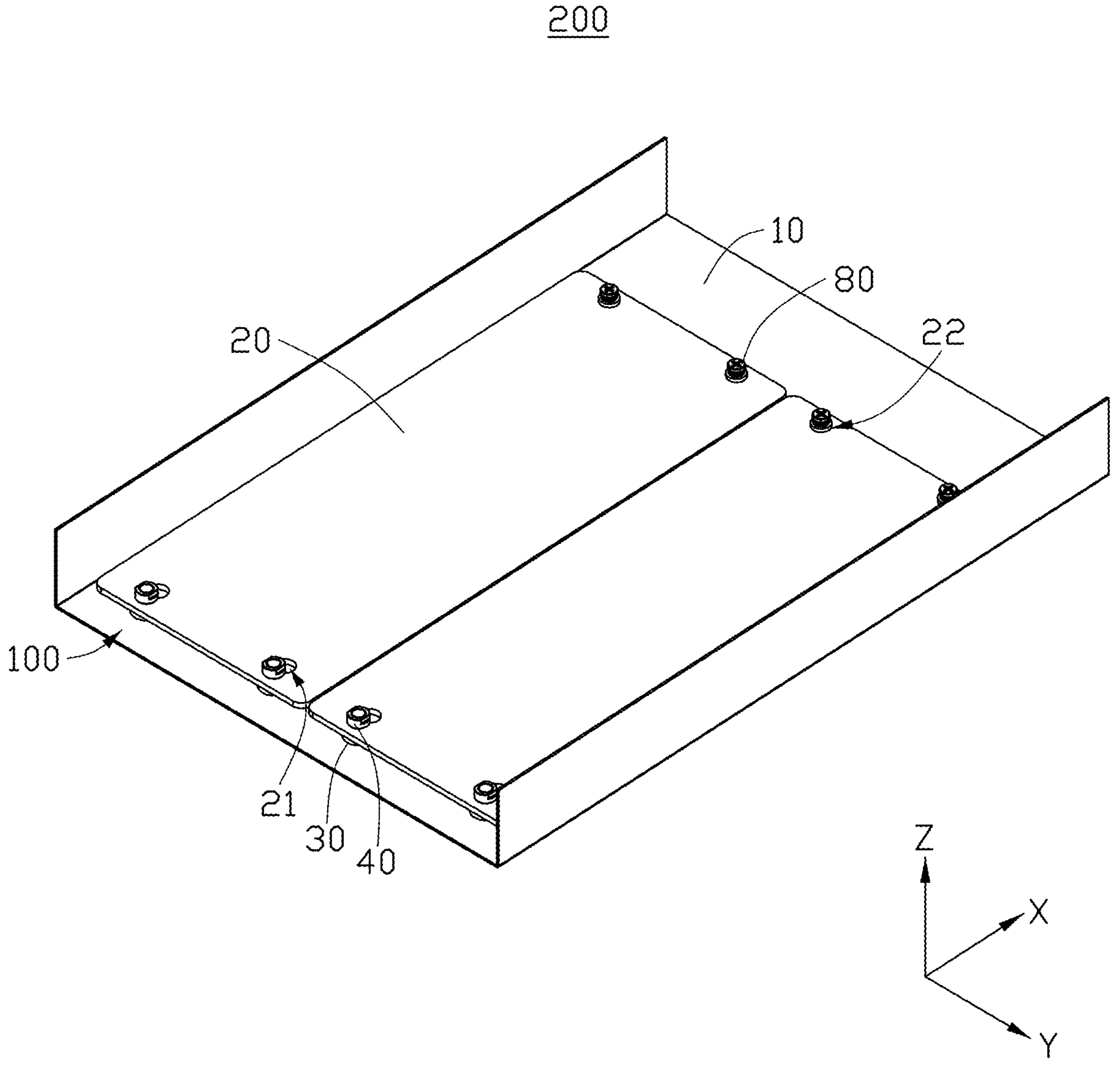
FIG. 1 is a diagrammatic view of an embodiment of a fixing assembly including a fastening device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Figure 2:
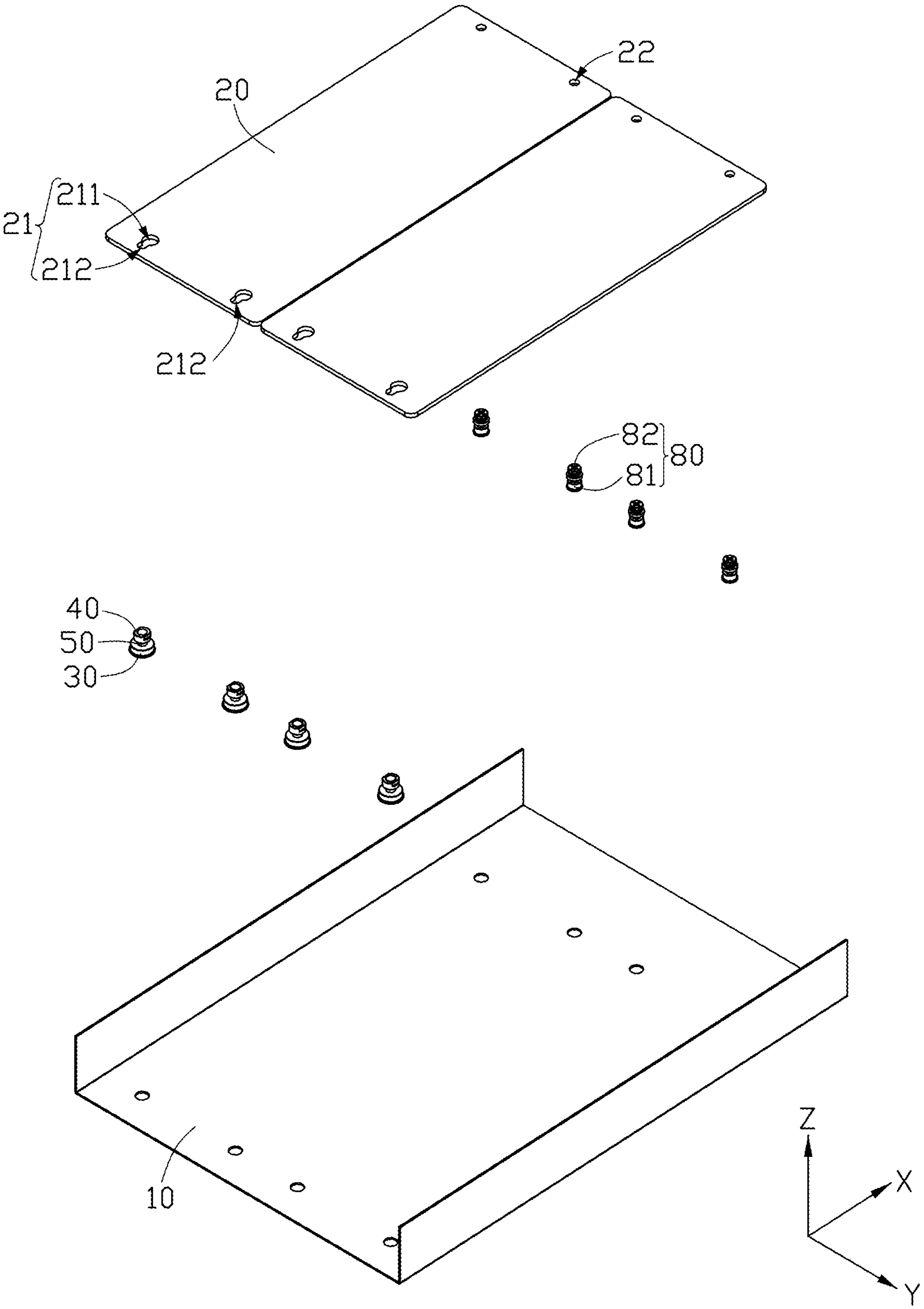
FIG. 2 is an exploded view of the fixing assembly of FIG. 1.

Referring to FIGS. 1 and 2, a fastening device 100 is provided according to an embodiment of the present disclosure. The fastening device 100 may fix a first plate 10 to a second plate 20. The first plate body 10 and the second plate body 20 are stacked along a first direction Z. A second direction X, a third direction Y, and the first direction Z are perpendicular to each other. A first positioning hole 21 is defined on the second plate 20. In some embodiments, the first plate 10 may be an electromagnetic shield, and the second plate 20 may be a circuit board. In other embodiments, the first plate 10 may be a housing of a heat sink, and the second plate 20 may be a heating element.

Figure 3:
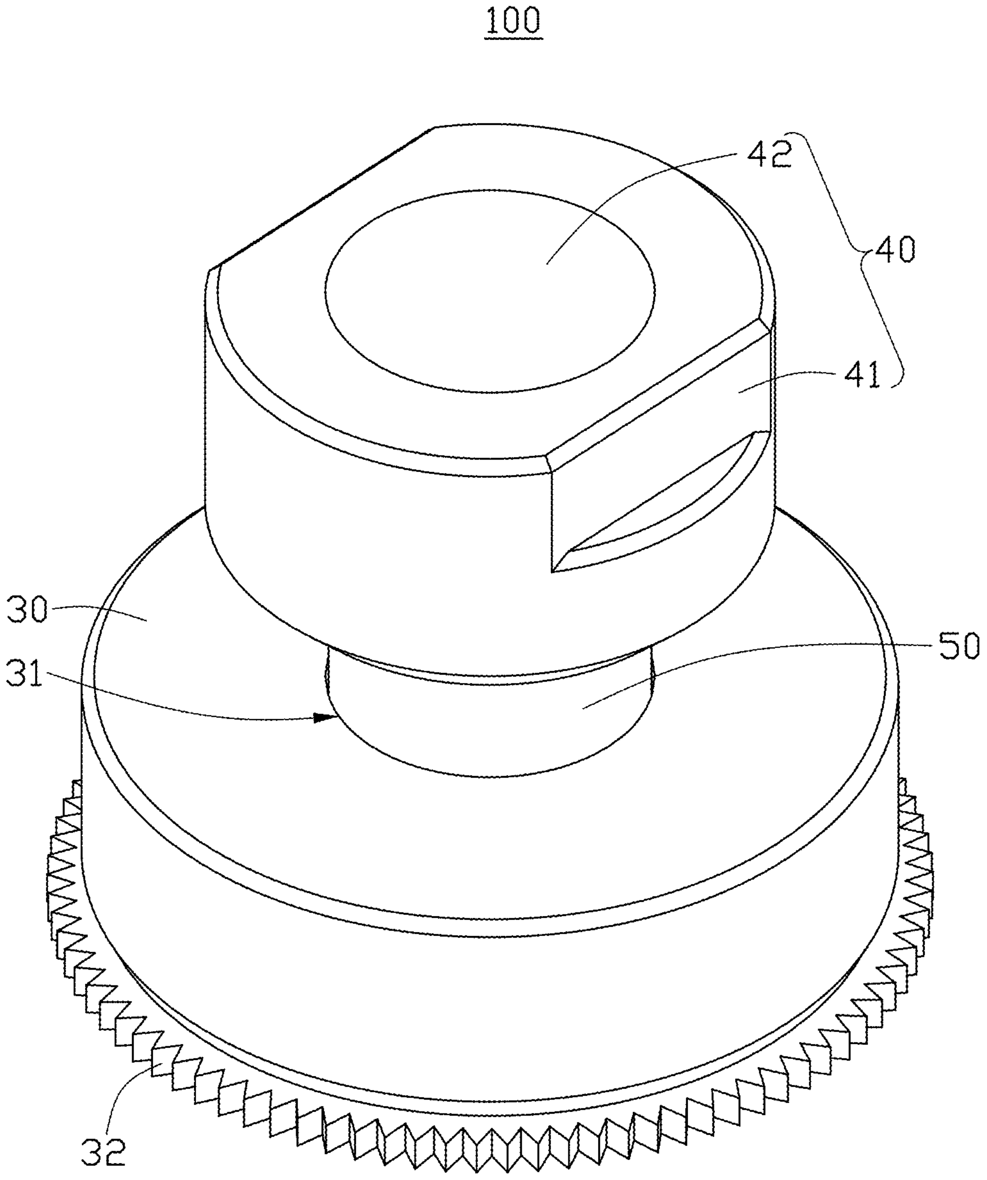
FIG. 3 is a diagrammatic view of the fastening device of FIG. 1.
Figure 4:
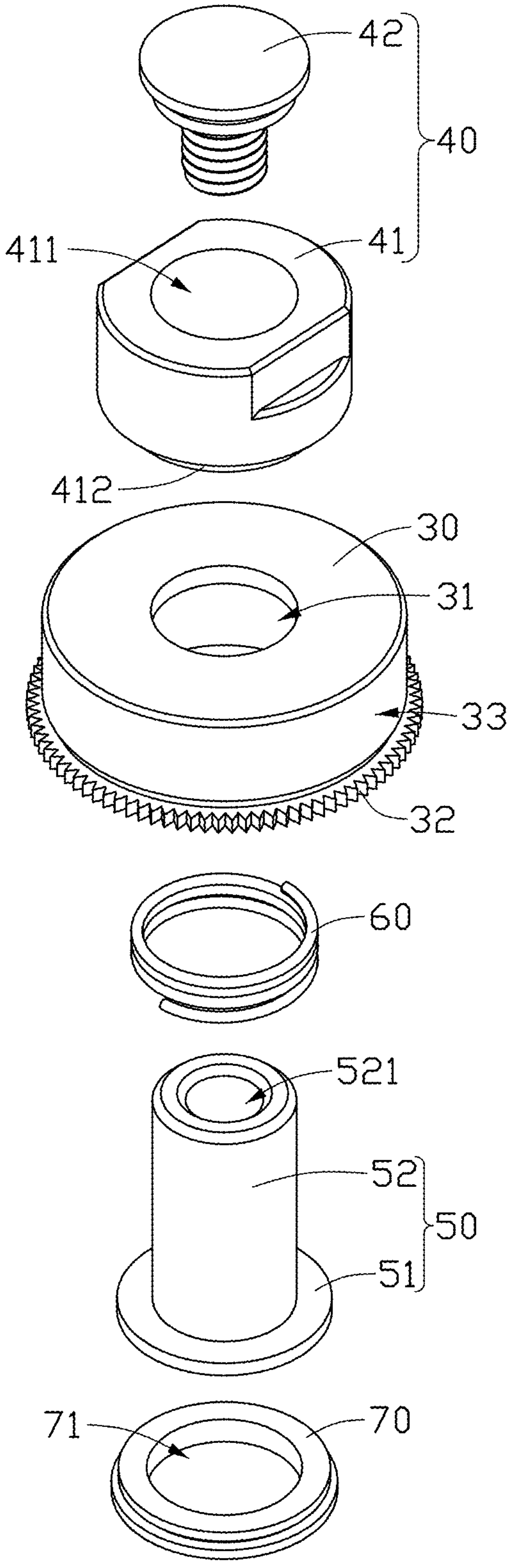
FIG. 4 is an exploded view of the fastening device of FIG. 1.

Referring to FIGS. 2, 3, and 4, the fastening device 100 includes a fixing member 30, a pressing member 40, a guiding member 50, and an elastic member 60. The fixing member 30 may be connect to resist against the first plate 10. The fixing member 30 can be located between the first plate 10 and the second plate 20. A receiving cavity 31 is defined on a surface of the fixing member 30 facing the first plate 10. The pressing member 40 and the fixing member 30 are spaced apart from each other along the first direction Z. The second plate 20 disposed between the fixing member 30 and the pressing member 40. The guiding member 50 is partially disposed in the receiving cavity 31, and the pressing member 40 is disposed out of the receiving cavity 31. The guiding member 50 further protrudes from the receiving cavity 31 and the first positioning hole 21. The elastic member 60 is accommodated in the receiving cavity 31. One end of the elastic member 60 is connected to a cavity wall 312 of the receiving cavity 31, and another end of the elastic member 60 is connected to the guiding member 50.

When the second plate 20 needs to be mounted onto the first plate 10, the first positioning hole 21 is aligned with the fixing member 30 mounted on the first plate 10. When the second plate 20 is resisted against the fixing member 30, the second plate 20 is pushed and moves to between the fixing member 30 and the pressing member 40 along the second direction X. The elastic member 60 may drive the guiding member 50 and the pressing member 40 connected to the guiding member 50 to resist against the second plate 20 towards the first plate 10. Under a cooperation of the guiding member 50 and the elastic member 60, the pressing member 40 clamps the second plate 20 between the fixing member 30 and the pressing member 40, thereby improving a connection stability between the second plate 20 and the first plate 10.

Referring to FIGS. 1 and 2, in the embodiment, the second plate 20 is fixed to the first plate 10 through two fastening devices 100, which are spaced apart from each other along the third direction Y to improve the connection stability between the second plate 20 and the first plate 10.

In other embodiments, a quantity of fastening device(s) 100 may also be adjusted according to a size of the second plate 20. That is, the quantity of fastening device(s) 100 may be one, three, four, five or six.

Figure 5:
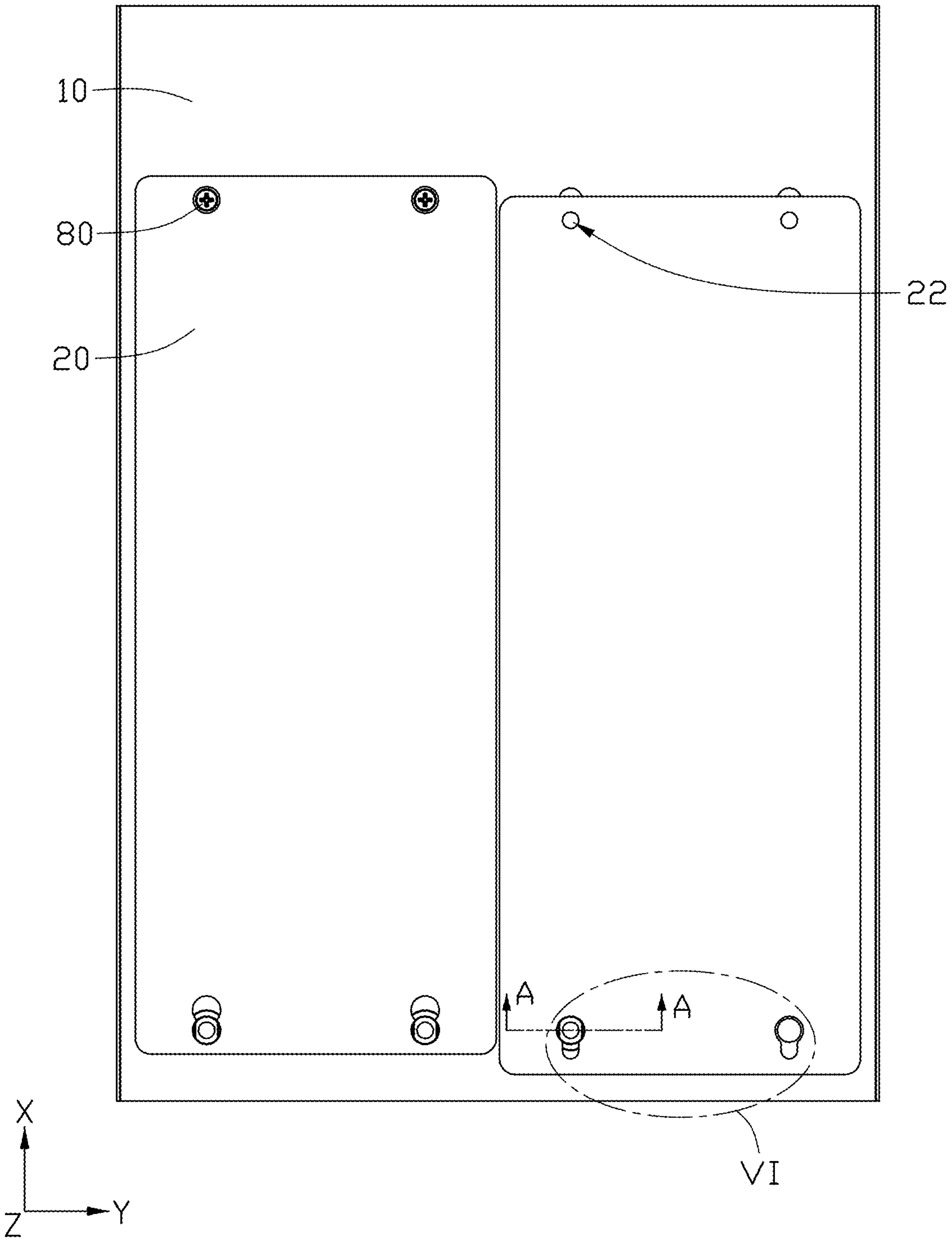
FIG. 5 is a top plan view of a second plate extending through a pressing member of FIG. 1.
Figure 6:
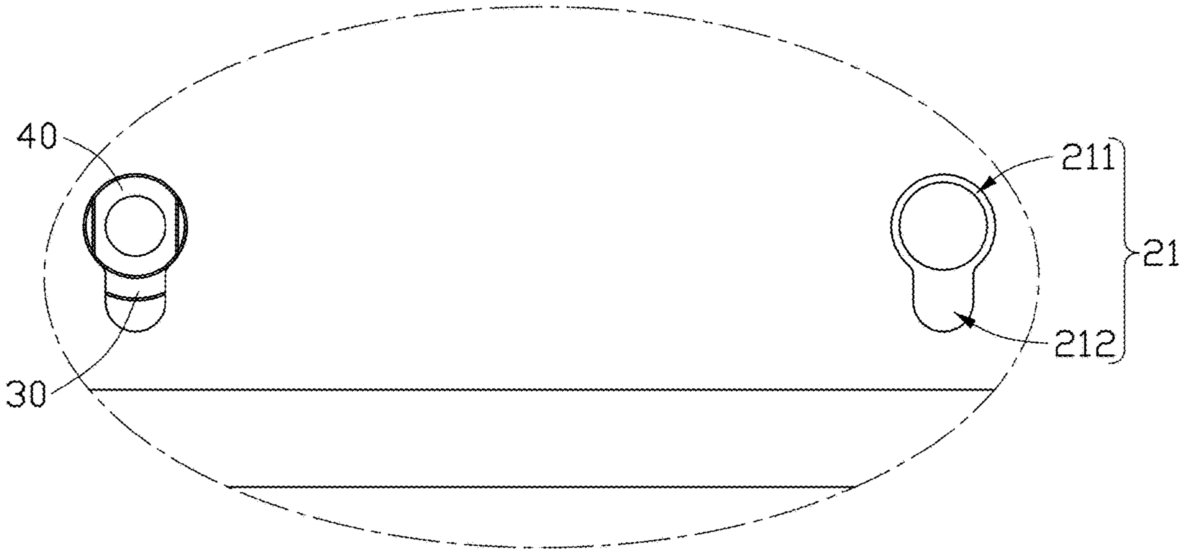
FIG. 6 is an exploded view of an area VI of the fixing assembly of FIG. 5.
Figure 7:
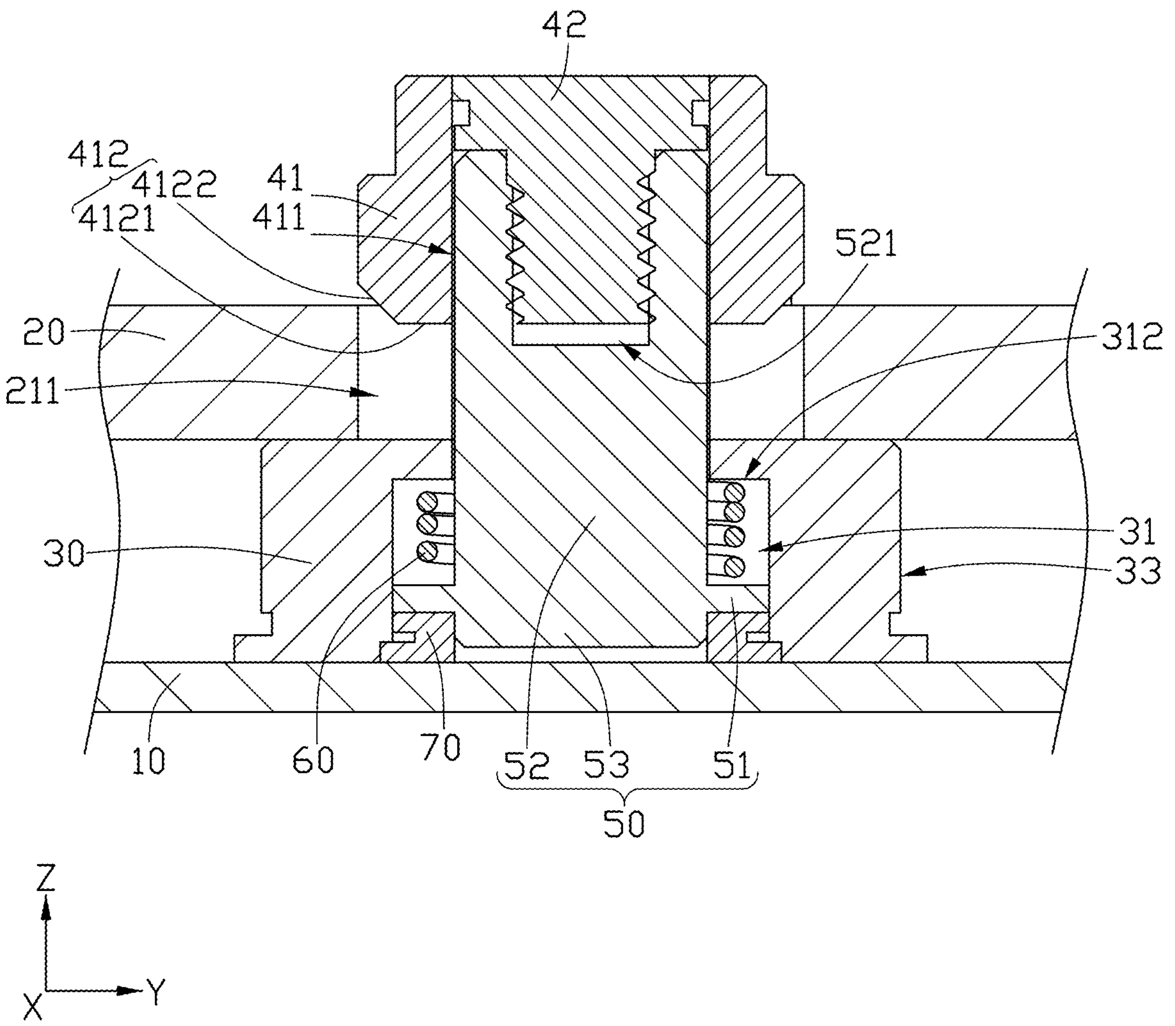
FIG. 7 is a cross-sectional view taken along a view line A-A of FIG. 5.

Referring to FIGS. 5, 6, and 7, in some embodiments, the guiding member 50 includes a stopping portion 51 and a guiding portion 52. The stopping portion 51 is accommodated in the receiving cavity 31. One end of the guiding portion 52 is accommodated in the receiving cavity 31 and connected to the stopping portion 51. Another end of the guiding portion 52 protrudes from the receiving cavity 31 to connect to the pressing member 40. The guiding portion 52 is slidably connected to the fixing member 30 along the first direction Z. The elastic member 60 is sleeved on an outer sidewall of the guiding portion 52 and resiliently resists against the stopping portion 51 and the cavity wall 312 of the receiving cavity 31. When the second plate 20 moves between the fixing member 30 and the pressing member 40, the pressing member 40 drives the guiding portion 52 to move away from the fixing member 30. At the same time, the stopping portion 51 compresses the elastic member 60 towards the cavity wall 312 of the receiving cavity 31. When the second plate 20 moves between the pressing member 40 and the fixing member 30, a rebounding force of the elastic member 60 is applied onto the stopping portion 51, which drives the guiding portion 52 and the pressing member 40 connected to the guiding portion 52 to move towards the second plate 20, thereby allowing the second plate 20 to be clamped between the pressing member 40 and the fixing member 30 and improving the connection stability between the second plate 20 and the first plate 10.

Referring to FIGS. 4, 5, 6, and 7, in some embodiments, the fastening device 100 further includes a limiting member 70. The limiting member 70 is disposed in the receiving cavity 31 and on the side of the stopping portion 51 facing away from the guiding portion 52. The limiting member 70 may resist against the stopping portion 51 and reduce the risk of the stopping portion 51 disengaging from the receiving cavity 31 when the guiding portion 52 moves along the first direction Z.

Referring to FIGS. 4 and 7, in some embodiments, the guiding member 50 further includes a protrusion 53. The protrusion 53 protrudes from the side of the stopping portion 51 facing away from the guiding portion 52. The limiting member 70 is provided with a limiting hole 71 (shown in FIG. 4), and the protrusion 53 extends into the limiting hole 71. The limiting hole 71 may reduce the risk of the guiding member 50 deviating relative to the limiting member 70.

The fixing member 30 further includes a plurality of latches 32 spaced apart from each other. The latches 32 are disposed on an outer sidewall 33 of the fixing member 30. The latches 32 is configured to resist against the first plate 10, thereby improving the connection strength between the fixing member 30 and the first plate 10.

Referring to FIGS. 4 and 7, in some embodiments, the pressing member 40 includes a pressing portion 41 and a screw portion 42. The pressing portion 41 is spaced apart from the fixing member 30 along the first direction Z. A through hole 411 is defined on the pressing portion 41. The screw portion 42 is disposed in the through hole 411 and fixed to the pressing portion 41. A threaded hole 521 is defined on an end of the guiding portion 52 away from the stopping portion 51. The guiding portion 52 extends into the through hole 411 and the screw portion 42 is engaged with the threaded hole 521, thereby improving a connection strength between the guiding member 50 and the pressing member 40.

Figure 8:
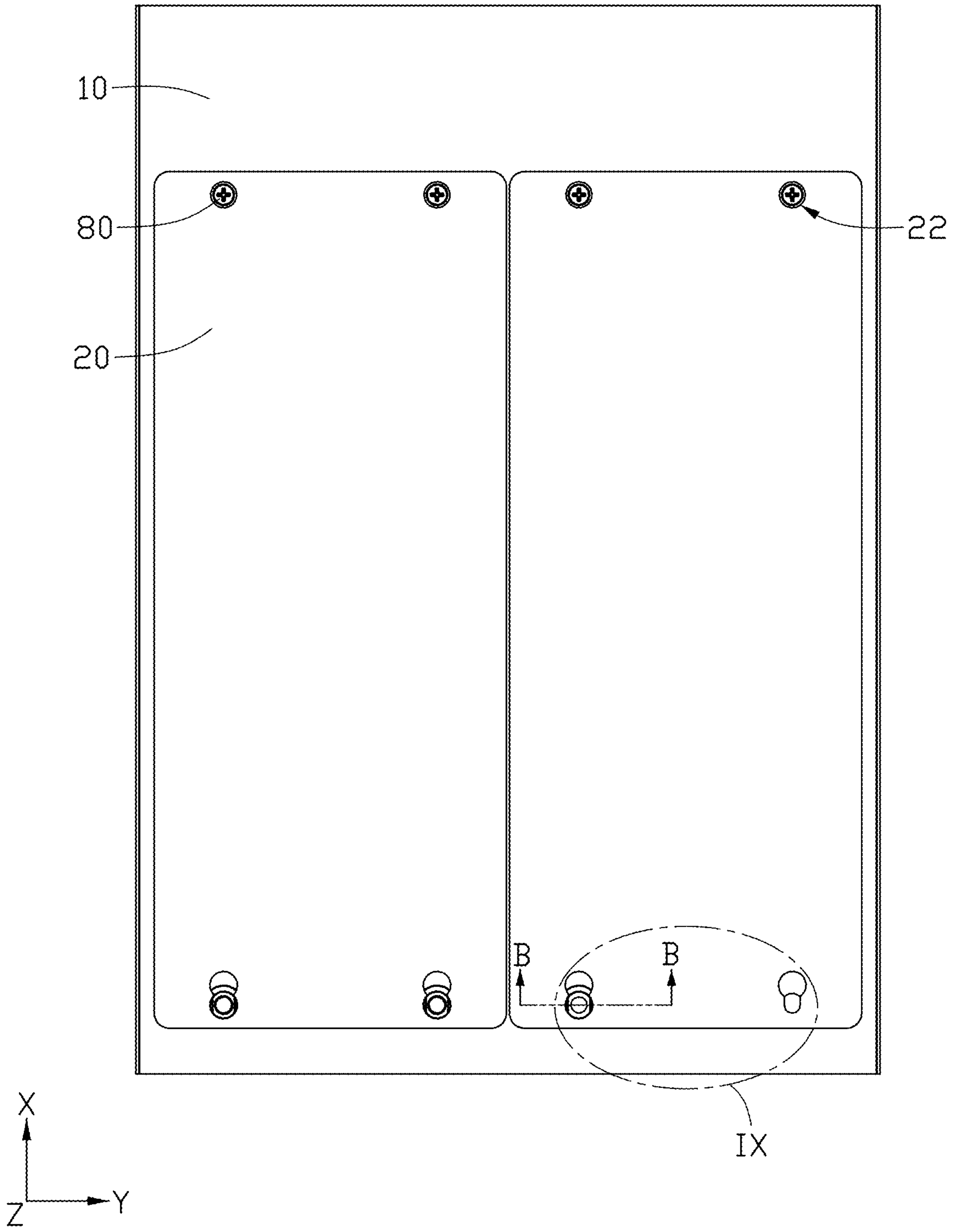
FIG. 8 is a top plan view of a second plate disposed between a fixing member and a pressing member of FIG. 1.
Figure 9:
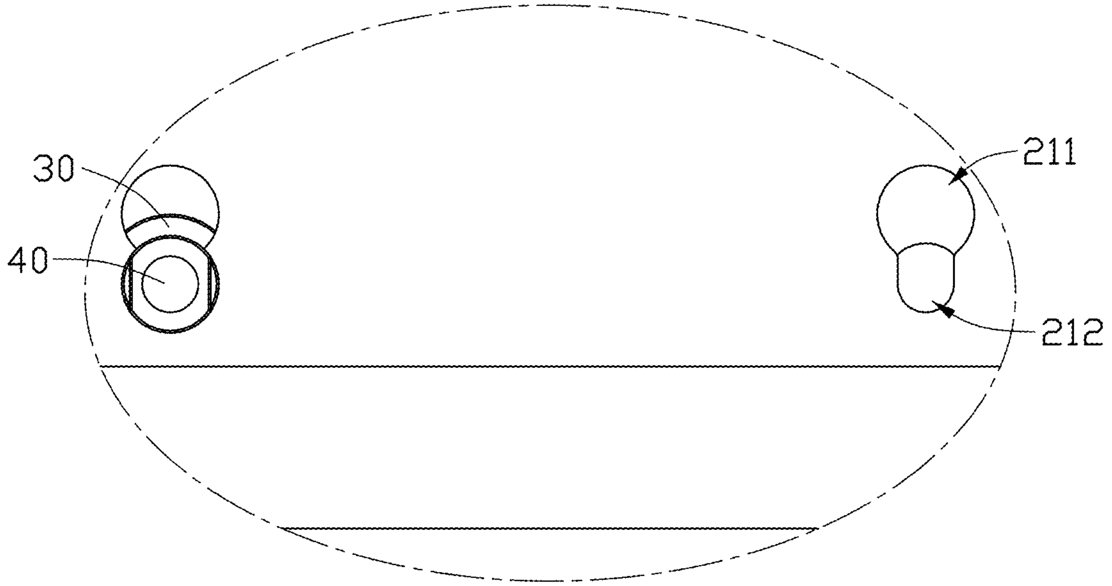
FIG. 9 is an exploded view of an area IX of the fixing assembly of FIG. 8.
Figure 10:
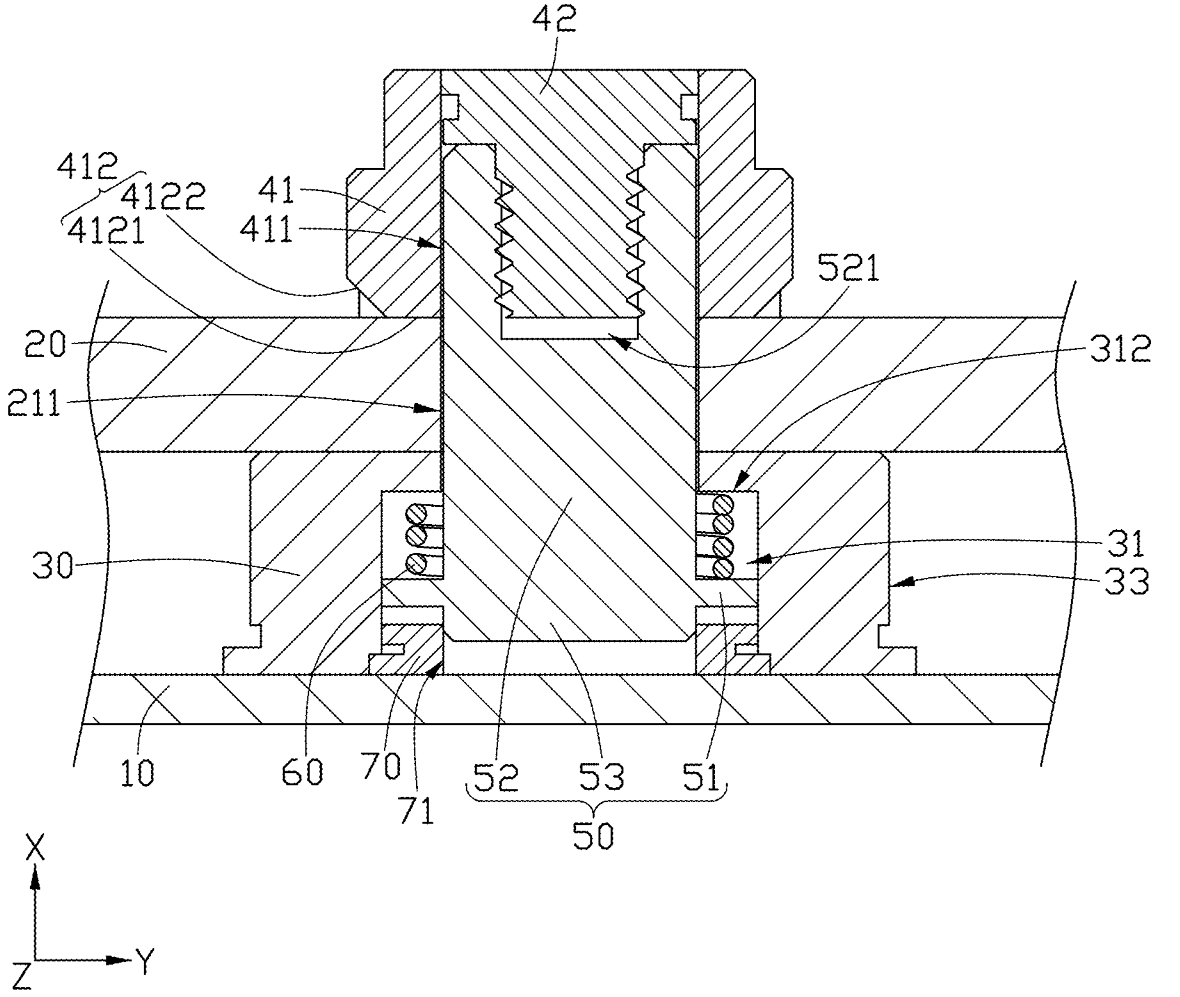
FIG. 10 is a cross-sectional view taken along a view line B-B of FIG. 8.

Referring to FIGS. 8, 9, and 10, in some embodiments, the pressing portion 41 includes a resisting surface 412 facing the fixing member 30. The resisting surface 412 includes a pressing area 4121 and a guiding area 4122. The pressing area 4121 may resist against the second plate 20. The guiding area 4122 surrounds the circumference of the pressing area 4121 and is inclined relative to the pressing area 4121. The guiding area 4122 may allow the second plate 20 to slide along the guiding area 4122 to below the pressing area 4121. When the second plate 20 is pushed and moves between the fixing member 30 and the pressing member 40, the second plate 20 may slide along the guiding area 4122 to below the pressing area 4121, thereby reducing a risk of the second plate 20 deviating from the desired moving trajectory during the movement of the second plate 20.

Referring to FIGS. 1, 2, and 4, in some embodiments, a fixing assembly 200 is provided according to an embodiment of the present disclosure. The fixing assembly 200 includes a first plate 10, a second plate 20, and the fastening device 100. The fixing member 30 is connected to the first plate 10, and the pressing member 40 extends through the first positioning hole 21 of the second plate 20 to allow the second plate 20 to contact to the fixing member 30. The elastic member 60 may be compressed between the cavity wall 312 of the receiving cavity 31 and the guiding member 50 when the second plate 20 moves along the second direction X and is disposed between the fixing member 30 and the first pressing member 40. The elastic member 60 may further drive the guiding member 50 and the pressing member 40 connected to the guiding member 50 to resist against the second plate 20 towards the first plate 10 when the second plate 20 moves between the fixing member 30 and the pressing member 40. The fastening device 100 may fix and fasten the second plate 20 on the first plate 10.

Figure 11:
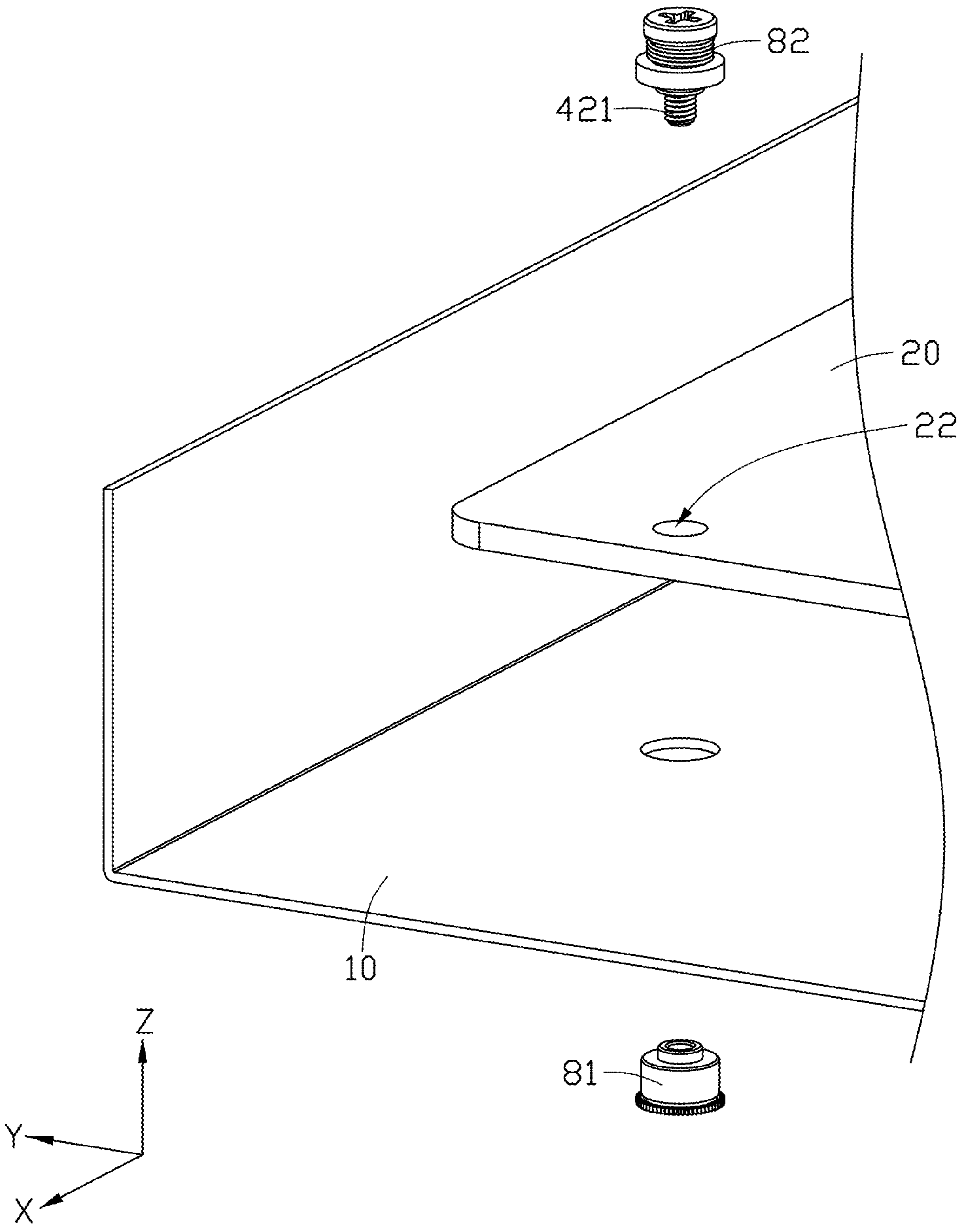
FIG. 11 is a locking member of the fixing assembly of FIG. 1.

Referring to FIGS. 1 and 11, in some embodiments, the fastening device 100 further includes a locking member 80. After the fastening device 100 connects one end of the first plate 10 and the second plate 20, the locking member 80 may lock the other end of the first plate 10 and the second plate 20. The locking member 80 locks the other end of the first plate 10 and the second plate 20, thereby further improving the connection stability between the first plate 10 and the second plate 20.

Referring to FIG. 11, in some embodiments, the locking member 80 includes a fixing portion 81 and a locking portion 82. The fixing portion 81 is connected to the first plate 10. A second positioning hole 22 is defined on the second plate 20. The second positioning hole 22 is spaced apart from the first positioning hole 21 along the second direction X. The locking portion 82 extends through the second positioning hole 22 to connect to the fixing portion 81. The locking portion 82 cooperates with the fixing portion 81 to improve the connection strength between the first plate 10 and the second plate 20.

In the embodiment, the fixing assembly 200 includes two locking members 80, which are spaced apart from each other along the third direction Y to improve the connection stability between the second plate 20 and the first plate 10.

In other embodiments, a quantity of locking member(s) 80 may also be adjusted according to a size of the second plate 20. That is, the quantity of locking member(s) 80 may be one, three, four, five, six, etc.

Referring to FIGS. 2 and 3, in some embodiments, the first positioning hole 21 includes a first positioning portion 211 and a second positioning portion 212 communicating with each other. A projection of the second positioning portion 212 along the second direction X is disposed within a projection of the first positioning portion 211 along the second direction X. A diameter of the second positioning portion 212 is smaller than a diameter of the first positioning portion 211, so that the guiding member 50 may be held in the second positioning portion 212 when the guiding member 50 slides into the second positioning portion 212 from the first positioning portion 211.

Referring to FIGS. 1, 7, and 10, in some embodiments, the fastening device 100 may fix the second plate 20 to the first plate 10 through the following steps.

The fixing member 30 of the fastening device 100 is fixed to the first plate 10. The first positioning portion 211 in the first positioning hole 21 on the second plate 20 is aligned with the pressing member 40, the pressing member 40 extends through the first positioning portion 211, and the second plate 20 is disposed on the fixing member 30. The guiding portion 52 of the guiding member 50 extends through the second plate 20 from the first positioning portion 211, and a portion of the pressing portion 41 of the pressing member 40 is accommodated in the first positioning portion 211.

The second plate 20 is pushed along the second direction X, so that the guiding portion 52 is push from the first positioning portion 211 into the second positioning portion 212. During this process, the second plate 20 slides along the guiding area 4122 of the pressing portion 41 to be under the pressing area 4121 of the pressing portion 41, and the second plate 20 pushes the pressing member 40 in a direction away from the first plate 10, thereby causing the pressing member 40 to drive the guiding member 50 connected to the pressing member 40 to move in a direction away from the first plate 10. At this time, the stopping portion 51 of the guiding member 50 compresses the elastic member 60 disposed in the fixing member 30 until the guiding portion 52 extends through the second plate 20 from the second positioning portion 212. The pressing area 4121 comes into contact with the surface of the second plate 20.

After the second plate 20 moves between the fixing member 30 and the pressing member 40, the rebounding force of the elastic member 60 is applied on the stopping portion 51 of the guiding member 50, thereby driving the pressing member 40 towards the first plate 10, thereby securing the second plate 20 between the fixing member 30 and the pressing member 40.

Then, the other end of the second plate 20 is fixed to the first plate 10 by the locking member 80 to improve the connection stability between the second plate 20 and the first plate 10.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A fastening device configured to fix a first plate on a second plate along a first direction, the first plate defining a positioning hole, the fastening device comprising:

a fixing member configured to connect to the first plate, the fixing member defining a receiving cavity;

a pressing member spaced apart from the fixing member along the first direction;

a guiding member comprising a stopping portion and a guiding portion, the stopping portion disposed in the receiving cavity, an end of the guiding portion disposed in the receiving cavity and connected to the stopping portion, another end of the guiding portion protruding from the receiving cavity and connected to the pressing member, the guiding member configured to extend through the positioning hole to cause the second plate to be disposed between the fixing member and the pressing member; and an elastic member disposed in the receiving cavity and resisting against a cavity wall of the receiving cavity and the guiding member, the elastic member configured to drive the guiding member and the pressing member toward the first plate when the second plate moves between the pressing member and the fixing member, thereby fixing the second plate to the first plate;

wherein the pressing member comprises a pressing portion and a screw portion, the pressing portion is spaced apart from the fixing member along the first direction and defines a through hole, the screw portion is disposed in the through hole and fixed to the pressing portion, an end of the guiding portion away from the stopping portion defines a threaded hole, the guiding portion extends into the through hole, and the screw portion is engaged with the threaded hole.

2. The fastening device of claim 1, wherein the guiding portion is slidably connected to the fixing member along the first direction, and the elastic member is sleeved on the guiding portion and resists against the stopping portion and the cavity wall of the receiving cavity.

3. The fastening device of claim 2, further comprising a limiting member disposed in the receiving cavity and on a side of the stopping portion facing away from the guiding portion, wherein the limiting member is configured to resist against the stopping portion.

4. The fastening device of claim 3, wherein the guiding member further comprises a protrusion and on the side of the stopping portion facing away from the guiding portion, and the limiting member defines a limiting hole configured for receiving the protrusion.

5. The fastening device of claim 1, wherein the fixing member further comprises a plurality of latches spaced apart from each other, the plurality of latches is disposed on an outer sidewall of the fixing member, and the plurality of latches is configured to connect to the first plate.

6. The fastening device of claim 1, wherein the pressing portion comprises a resisting surface facing the fixing member, the resisting surface comprises a pressing area and a guiding area, the pressing area is configured to resist against the second plate, the guiding area surrounds the pressing area and is inclined relative to the pressing area, and the guiding area is configured to allow the second plate to slide along the guiding area to below the pressing area.

7. A fixing assembly comprising a first plate defining a positioning hole;

a second plate fixed on the first plate along a first direction; and a fastening device comprising:

a fixing member connecting to the first plate, the fixing member defining a receiving cavity;

a pressing member spaced apart from the fixing member along a first direction;

a guiding member comprising a stopping portion and a guiding portion, the stopping portion disposed in the receiving cavity, an end of the guiding portion disposed in the receiving cavity and connected to the stopping portion, another end of the guiding portion protruding from the receiving cavity and connected to the pressing member, the guiding member configured to extend through the positioning hole to cause the second plate to be disposed between the fixing member and the pressing member; and an elastic member disposed in the receiving cavity and resisting against a cavity wall of the receiving cavity and the guiding member, the elastic member driving the guiding member and the pressing member to resist against the second plate towards the first plate when the second plate moves between the pressing member and the fixing member, thereby fixing the second plate to the first plate;

wherein the pressing member comprises a pressing portion and a screw portion, the pressing portion is spaced apart from the fixing member along the first direction and defines a through hole, the screw portion is disposed in the through hole and fixed to the pressing portion, an end of the guiding portion away from the stopping portion defines a threaded hole, the guiding portion extends into the through hole, and the screw portion is engaged with the threaded hole.

8. The fixing assembly of claim 7, further comprising a locking member connected to one end of the first plate away from the fastening device and one end of the second plate away from the fastening device.

9. The fixing assembly of claim 7, wherein the positioning hole comprises a first positioning portion and a second positioning portion communicating with each other, a projection of the second positioning portion in a second direction is disposed within a projection of the first positioning portion in the second direction, and the first direction is perpendicular to the second direction.

10. The fixing assembly of claim 7, wherein the guiding portion is slidably connected to the fixing member along the first direction, and the elastic member is sleeved on the guiding portion and resists against the stopping portion and the cavity wall of the receiving cavity.

11. The fixing assembly of claim 10, wherein the fastening device further comprises a limiting member disposed in the receiving cavity and on a side of the stopping portion facing away from the guiding portion, the limiting member is configured to resist against the stopping portion.

12. The fixing assembly of claim 11, wherein the guiding member further comprises a protrusion and on the side of the stopping portion facing away from the guiding portion, and the limiting member defines a limiting hole for receiving the protrusion.

13. The fixing assembly of claim 7, wherein the fixing member further comprises a plurality of latches spaced apart from each other, the plurality of latches is disposed on an outer sidewall of the fixing member, and the plurality of latches is configured to connect to the first plate.

14. The fixing assembly of claim 7, wherein the pressing portion comprises a resisting surface facing the fixing member, the resisting surface comprises a pressing area and a guiding area, the pressing area is configured to resist against the second plate, the guiding area surrounds the pressing area and is inclined relative to the pressing area, and the guiding area is configured to allow the second plate to slide along the guiding area to below the pressing area.

* * * * *